Figure 1:
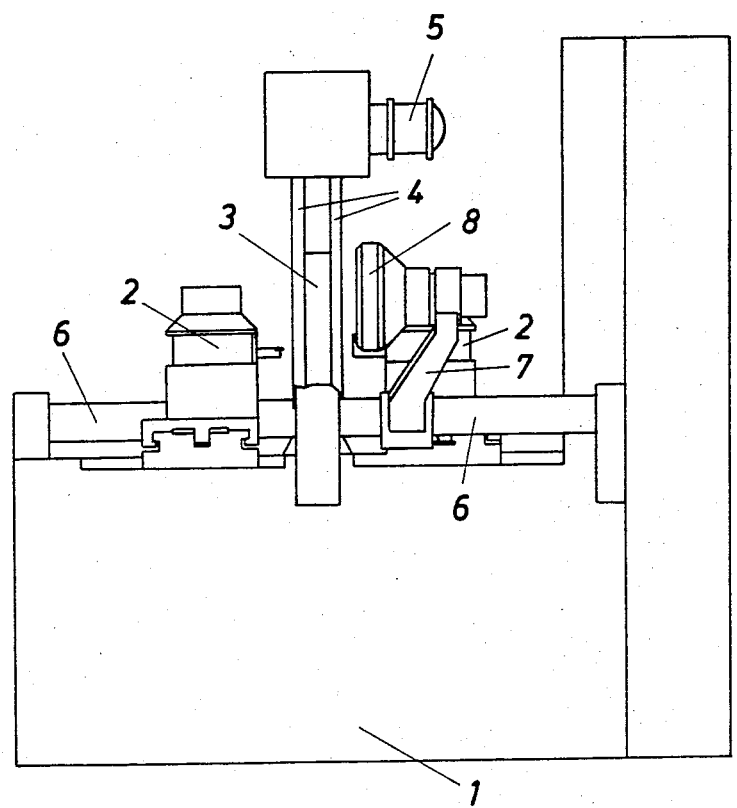

United States Patent [19]

Pühringer

[11] Patent Number: 4,512,223

[45] Date of Patent: Apr. 23, 1985

[54] LATHE

[75] Inventor: Franz Pühringer, Steyr, Austria

[73] Assignee: Steyr-Daimler-Puch Aktiengesellschaft, Vienna, Austria

[21] Appl. No.: 452,340

[22] Filed: Dec. 22, 1982

[51] Int. Cl.[3] .............................................. B23B 15/00
[52] U.S. Cl. .................................... 82/2.5; 82/2.7; 414/222; 414/225; 414/226
[58] Field of Search ................. 82/2.5, 2.7, 7, 8, 40 R, 82/28 R, 30; 414/222, 225, 226, 728, 742, 743; 279/114

[56] References Cited

U.S. PATENT DOCUMENTS

| | | | |
|---|---|---|---|
| 668,718 | 2/1901 | Sellers et al. | 82/8 |
| 727,413 | 5/1903 | McCracken | 82/8 |
| 1,338,742 | 5/1920 | Lofton | 29/36 |
| 1,833,601 | 11/1931 | Batterman et al. | 82/40 R |
| 1,877,922 | 9/1932 | Lovely | 82/40 R |
| 1,939,147 | 12/1933 | Snyder | 82/40 R |
| 2,529,205 | 11/1950 | Weimer | 82/40 R |
| 2,771,296 | 11/1956 | Retz | 82/40 R |
| 2,811,267 | 10/1957 | Bock | 414/736 |
| 2,919,010 | 5/1955 | Hautau et al. | 82/2.7 |
| 3,270,592 | 9/1966 | Behnke | 82/40 R |
| 3,455,190 | 7/1969 | Dalik | 82/2.7 |
| 3,534,642 | 10/1970 | Horobin | 82/2.7 |
| 4,064,774 | 12/1977 | Maddock | 82/8 |
| 4,161,849 | 7/1979 | Voumard et al. | 82/2.5 |

FOREIGN PATENT DOCUMENTS 622634 9/1978 U.S.S.R. ................................. 82/2.5

Primary Examiner—Leonidas Vlachos
Assistant Examiner—Jerry Kearns
Attorney, Agent, or Firm—Kurt Kelman

[57] ABSTRACT

A lathe has two tool units for machining a workpiece from both end faces, and a workpiece-gripping drive stock disposed between the two tool units. A single chuck is supported on the drive stock and includes a series of radially displaceable gripping members and two coaxial rings rotatable relative to each other for actuating the gripping members, an outer one of the rings serving as a pulley for a driving belt whereby the outer ring is driven and each one of the two rings having an annular series of coupling teeth at one end face thereof. Two devices for respectively loading and unloading the workpiece each comprises a carrier carrying coupling teeth, the coupling teeth of the two coaxial chuck rings being movable into mesh with the coupling teeth of said devices, the coupling teeth carrier of only one of the devices being rotatable and a motor being connected to the rotatable carrier for rotating the carrier. Axially displaceable collets for gripping the workpiece are aligned on the loading and unloading devices with the axis of the chuck and the collet of the unloading device is adapted to be forced back by pressure from the chuck. An adjustable stop is arranged to be engaged by the collet of the unloading device when it is forced back by the pressure from the chuck.

3 Claims, 7 Drawing Figures

LATHE

This invention relates to a lathe comprising a workpiece-gripping drive stock, between two tool units for machining the workpiece from both end faces.

Such center-driven machines with a drive stock provided with a chuck at each end are known. Whereas this permits the machining of two separate workpieces at the same time, it involves the disadvantages that the drive stock has a relatively large axial length. As a result, tubes or rods or shafts having a correspondingly large length can be turned at the same time at both end faces but it is not possible to machine discs or rings having a relatively small axial length on both end faces and possibly also on the inside in one operation. Besides, relatively complicated devices are required for loading and unloading the drive stock and for axially fixing the workpiece in the drive stock.

It is also known to provide lathes with loading and unloading devices which comprise a workpiece-gripping collet, mounted on a pivoted arm but such devices have not been suitable thus far for center-driven machines.

It is an object of the invention to eliminate these disadvantages and to provide a lathe which is of the kind described first hereinbefore and in which annular or disc-shaped workpieces, such as races of rolling element bearings, can be machined without rechucking and which permits a quick loading and unloading.

This object is accomplished according to the invention with a drive stock designed like a back rest as a bearing eye for only one chuck which, in a manner known per se, is provided with radially displaceable gripping jaws or with laminations, similar to disc springs. The chuck comprises two coaxial rings, rotatable relative to each other to actuate the gripping jaws or laminations, and the outer one of said rings serves as a driving belt pulley.

Because there is only one chuck and its gripping jaws or laminations are moved to and from the gripping position by a rotation of two coaxial rings relative to each other rather than by an axial displacement of a wedge or the like, the axial dimension is relatively small so that the chuck can be accommodated in a drive stock which is narrow like a back rest and rings or discs, i.e., workpieces having a small axial length, can be turned at the same time at both end faces and, if desired, also on their inside. The design is further simplified in that one ring of the chuck serves also as a drive belt pulley. To avoid a slip, a toothed belt drive will be selected. The lathe according to the invention can be used, e.g., to machine a race of a rolling element bearing on all sides, with the exception of its outside peripheral surface. This has previously required at least one rechucking.

According to the invention, each of the two rings of the chuck is provided on one end face with an annular series of coupling teeth, movable into mesh with mating coupling teeth, which are carried by one of two devices for loading and unloading the workpiece, respectively, and the mating tooth carrier of only one of the two devices is adapted to be rotated by a motor.

The loading and unloading devices are thus used to tighten and loosen the chuck because the carriers are provided with coupling teeth which mate with the coupling teeth of the two rings of the chuck. When the coupling teeth and the mating coupling teeth are in mesh and the tooth carrier of one device is rotated, the desired relative rotation will be imparted to the rings so that the workpiece will be gripped or released. Building the loading or unloading device will not involve a particularly high expediture because it is sufficient to provide mating coupling teeth and a motor drive for that member of one of two devices which carries the mating coupling teeth.

Also in accordance with the invention, each of the loading and unloading devices comprises a collet for gripping the workpiece, which collet is aligned with the axis of the chuck and is axially displaceable, and the chuck of the unloading device is adapted to be forced back by pressure from the chuck to an adjustable stop. By means of the displaceable chuck of the loading device the workpiece to be machined is pushed between the gripping jaws or laminations of the chuck. In that operation, the workpiece which has been machined pushes ahead the previously fixed workpiece been machined and is gripped by the collet of the unloading device, and that collet is pushed ahead too. As a result, the workpieces are changed in a very simple and quick operation which requires only a relatively simple design of the two devices. Piston drives which act against a spring or a double-acting may be used to displace the two collets.

A particularly simple design of the chuck will be obtained if one ring of the chuck forms radial guides for the gripping jaws, which, with their outer end faces, bear on internal spiral surfaces of the other ring under the action of a spring. In that case, a rotation of the two rings relative to each other will result in a radial displacement of the gripping jaws because the change of the points of support at the spiral surfaces will result in a change of the radial distance from the axis of the chuck. It will be understood that the spiral surfaces must have such a pitch that a self-locking effect is obtained.

If the gripping elements consist of laminations which are similar to disc springs, they can be axially stressed in accordance with the invention between the two rings, which can be screwed together by means of screw threads. The laminations have inherently a conical shape. If they are axially stressed while being supported at their outside periphery, so that the included angle of the cone is increased, their inner radius will be decreased so that the desired gripping action will be exerted on the workpiece.

Finally, the production costs can be reduced further if the outer ring of the chuck constitutes the inner race of a four-point bearing, by which the chuck is mounted in the drive stock. A four-point bearing is known to have the advantage that it serves as a radial bearing and as an axial bearing at the same time.

Figure 2:
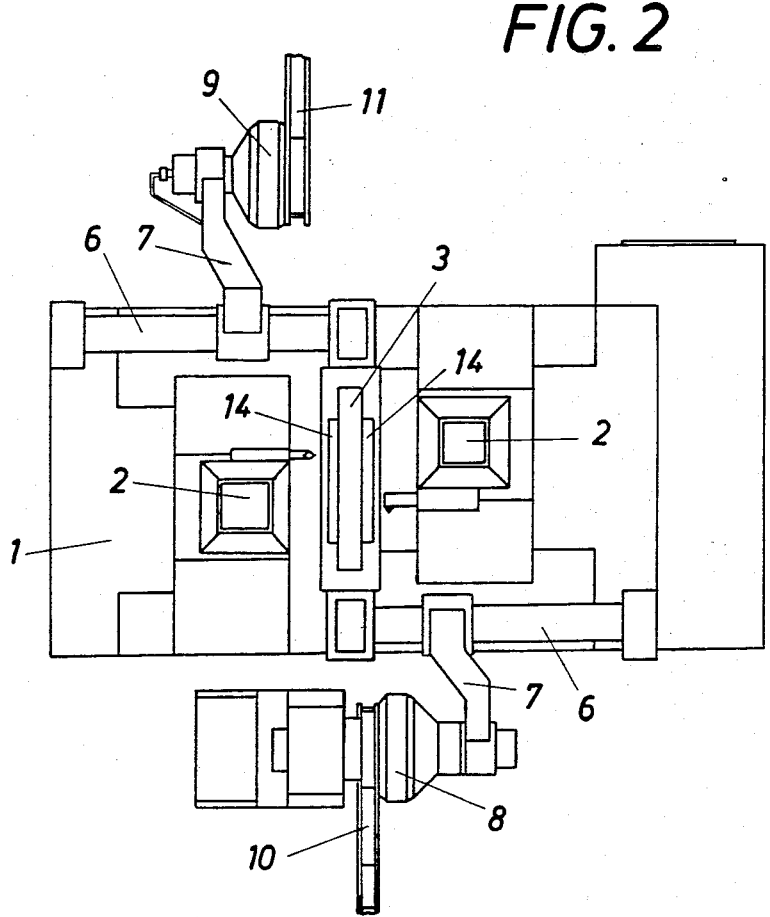
Figure 3:
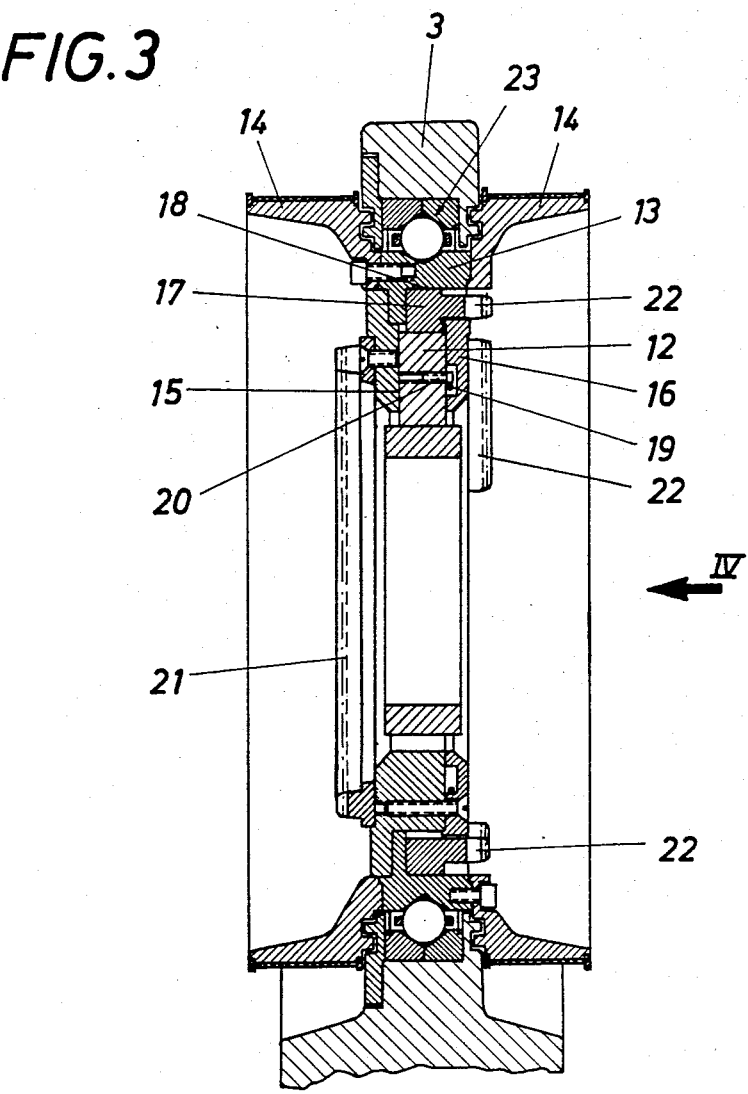
Figure 4:
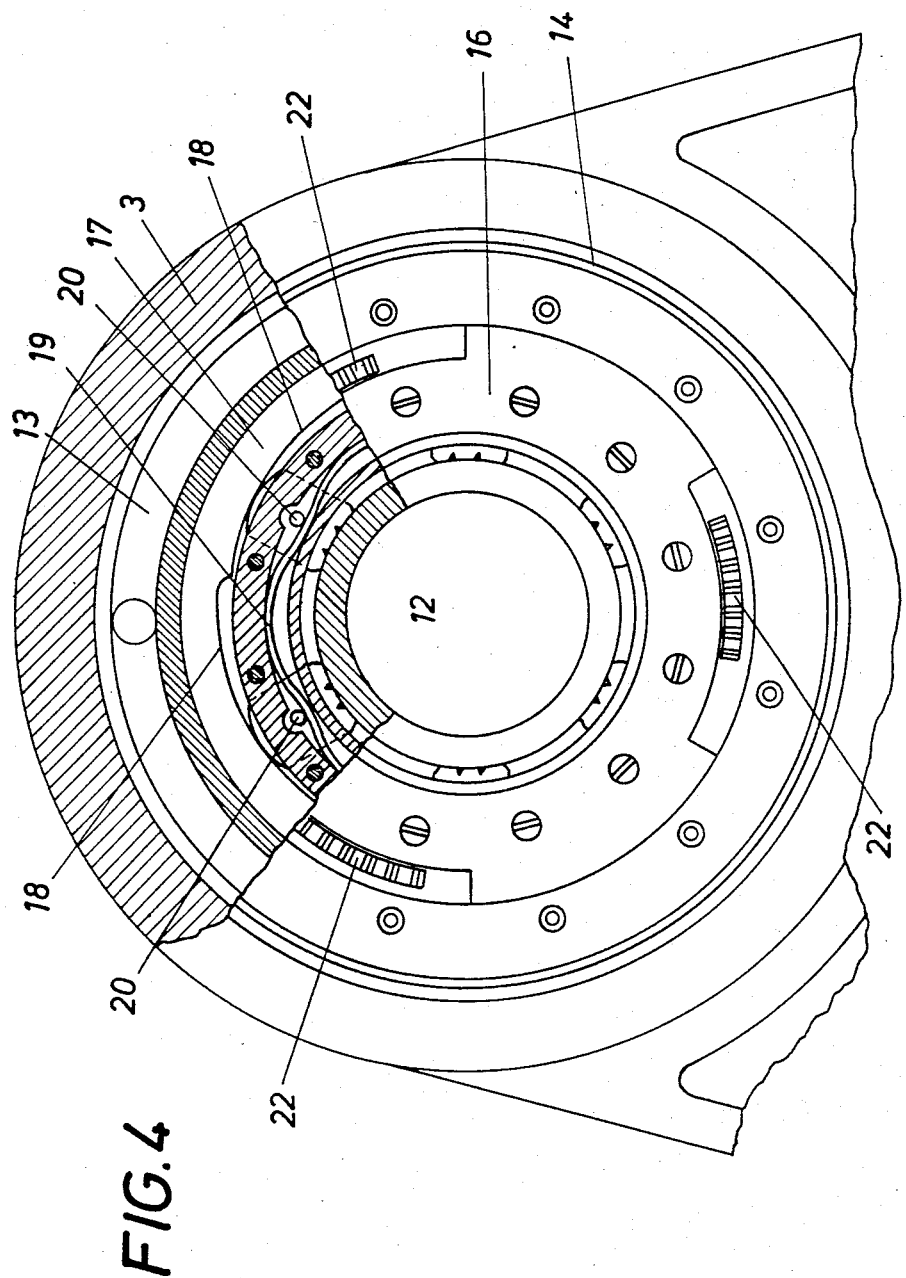
Figure 5:
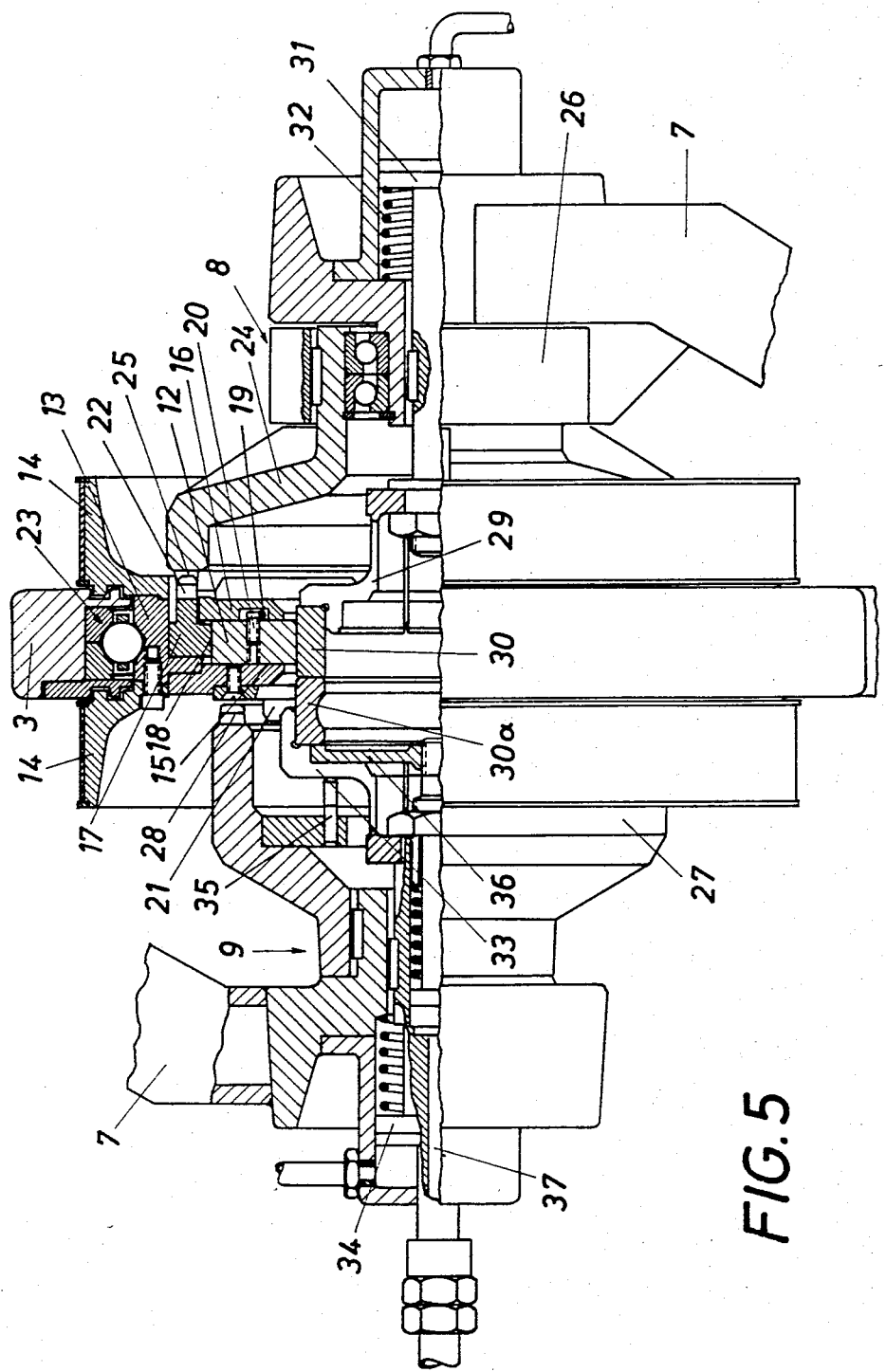
Figure 6:
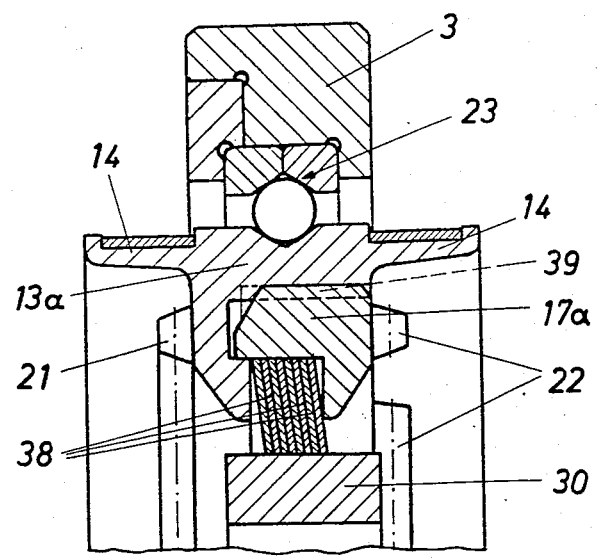
Figure 7:
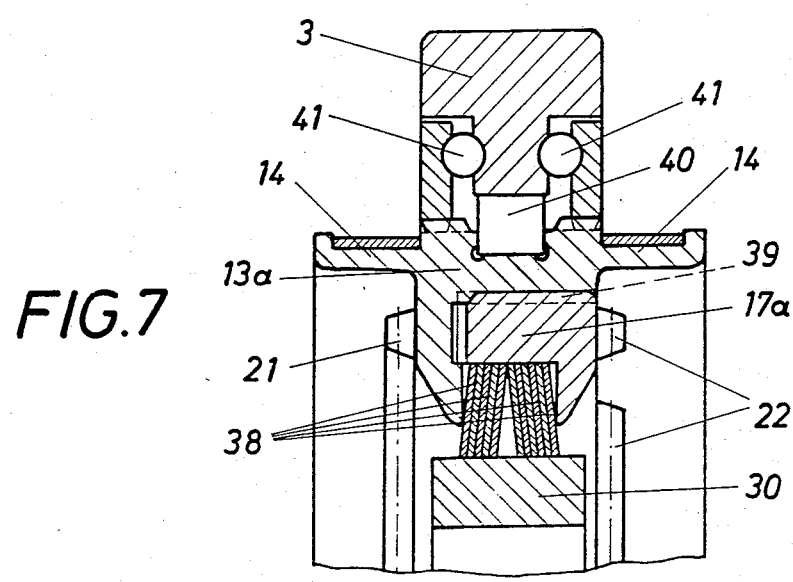

The subject matter of the invention is shown by way of example on the drawing, in which FIG. 1 is a diagrammatic side elevation showing a center-drive lathe, FIG. 2 is a corresponding top plan view, FIG. 3 is an axial sectional view showing the drive stock with the chuck on a larger scale, FIG. 4 is a corresponding end view, partly in section, in the direction of the arrow IV of FIG. 3, FIG. 5 is a fragmentary axial sectional view showing the drive stock with the chuck during the loading and unloading operation and FIGS. 6 and 7 show two modifications of the chuck on a still larger scale.

A stationary drive stock 3 is mounted on the machine bed 1 between two tool units 2, which may constitute turrets. The chuck of the drive stock 3 is driven by a toothed belt 4 from above (motor 5). Pivoted arms 7 are mounted on lateral horizontal axles 6 and carry a loading device 8 and an unloading device 9, respectively. The workpieces, e.g., races for rolling element bearings, are delivered via a conveyor trough 10 and are taken from the latter by the loading device 8 and by a pivotal movement of the arm 7 are moved to the chuck of the drive stock 3, where they are properly gripped. When the workpiece has been machined, it is received by the swung-in unloading device 9 and is deposited in a conveyor trough 11 when the associated arm 7 has been swung out.

The drive stock 3 is designed like a back rest as a bearing eye for a chuck which, in accordance with FIGS. 3 to 5, comprises radially displaceable gripping jaws 12. The chuck comprises an outer ring 13, which consists of a plurality of elements that have been screwed together and which with its elements 14 serves also as a drive belt pulley and forms radial guides 15 for the gripping jaws 12. The latter are held in the guides 15 by a cover 16 fixed by screws. The chuck also comprises an inner ring 17 coaxial with the outer ring 13 and having internal spiral surfaces 18 (FIG. 4), with which the gripping jaws 12 are engaged under the action of an annular spring 19. The annular spring 19 engages pins 20, mounted in the gripping jaws. The outer ring 13 is provided with an annular series of coupling teeth 21 and the inner ring 17 is provided with similar coupling teeth 22. In accordance with FIGS. 3 and 5, the outer race 13 of the chuck is mounted in the drive stock 3 by a four-point bearing 23 and the outer ring 13 constitutes the inner race of the bearing.

A rotation of the outer ring 13 and the inner ring 17 relative to each other will result in the desired radial adjustment of the gripping jaws 12 because they bear on the spiral surfaces 18 of the inner ring 17.

FIG. 5 shows the position in which the loading device 8 has been swung in toward and pushed against the drive stock 3. The loading device 8 comprises a drum 24, provided at its end face with coupling teeth 25 mating with the coupling teeth 22 of the inner ring 17 and rotatable by a hydromotor 26. The unloading device 9 has also been moved to the drive stock 3 and is also provided with a drum 27, which carries teeth 28 mating with the coupling teeth 21 of the outer ring 13. But the drum 27 cannot be rotated. As the two devices 8, 9 are moved to the drive stock 3, the mating coupling teeth 25, 28 will mesh with the coupling teeth 22, 21 of the two rings 17, 13 of the chuck. When the drum 24 is then rotated by the hydromotor 26 and the outer ring 13 is held in position by the mating coupling teeth 28 of the drum 27, the desired relative rotation will be imparted to the two rings 13, 17 of the chuck and will result in the operation of the gripping jaws 12.

A collet 29 is mounted in the loading device 8 and receives the workpiece 30 to be machined and by means of a hydraulically actuated piston 31 pushes the workpiece 30 against the force of a spring 32 between the opened gripping jaws 12. At the same time, the workpiece 30a which has been machined is introduced into the collet 33 of the unloading device 9. The collet 33 is also displaceable by means of a hydraulically actuated piston 34. The machined workpiece 30a is forced back under pressure in the collet 33 until the latter engages an adjustable stop pin 35. When the workpieces have been changed, the loading and unloading devices 8, 9 are retracted from the drive stock 3 and are swung out in order to receive a new workpiece and to deposit the machined workpiece 30a in the trough 11. The unloading device 9 contains an ejector 36, which can also be hydraulically actuated through an axial bore 37.

As is apparent from FIGS. 6 and 7, laminations 38, which are similar to disc springs, may be used instead of the gripping jaws 12 and are axially forced against each other to grip the workpiece 30. For this purpose, the outer ring 13a and the inner ring 17a of the chuck are provided with female and male screw threads 39, respectively, and can be screwed together to a larger or smaller extent. The laminations 38 are supported on the outside at the inner ring 38a so that the inside diameter of the laminations 38 will be reduced as the rings 13a, 17a are screwed together. FIG. 7 shows a radial bearing 40 and two axial bearings 41, which are provided instead of the four-point bearing 23.

I claim:

1. A lathe for handling a succession of workpieces having two end faces, which comprises a machine bed whereon there are mounted
   (a) two tool units for machining a respective one of the workpieces from both end faces,
   (b) a workpiece-gripping drive stock disposed between the two tool units,
   (c) a single chuck supported on the drive stock, the drive stock constituting a back rest and serving as a bearing eye for the chuck, and the chuck having an axis and including
      (1) a series of radially displaceable gripping members and
      (2) two coaxial rings rotatable relative to each other for actuating the gripping members, an outer one of the rings serving as a pulley for a driving belt whereby the outer ring is driven and each one of the two rings having an annular series of coupling teeth at one end face thereof,
   (d) device for loading the one workpiece for machining, the loading device comprising
      (1) a rotatable carrier carrying coupling teeth movable into mesh with the coupling teeth of the two coaxial chuck rings and a motor connected to the rotatable carrier for rotating the carrier,
      (2) an axially displaceable collet for gripping the one workpiece, and
      (3) means for axially displacing the collet under pressure,
   (e) a device for unloading a previously machined one of the workpieces, the unloading device comprising
      (1) a non-rotatable carrier carrying coupling teeth movable into mesh with the coupling teeth of the two coaxial chuck rings,
      (2) an axially displaceable collet for gripping the machined workpiece,
      (3) yielding means for axially displacing the collet of the unloading device under the pressure of the axially displaced collet of the loading device, and
      (4) an adjustable stop arranged to be engaged by the collet of the unloading device when it is forced back by the pressure, and
   (f) means for moving the loading and unloading devices into and out of alignment with the axis of the chuck.

2. The lathe of claim 1, wherein the gripping members are disc spring laminations axially gripped between two rings held together by screws.

3. The lathe of claim 1, wherein the outer chuck ring constitutes an inner race of a four-point bearing for mounting the chuck in the drive stock.

* * * * *